March 22, 1932.  W. J. BROWER  1,850,657
BROODER
Filed Dec. 19, 1928   2 Sheets-Sheet 1
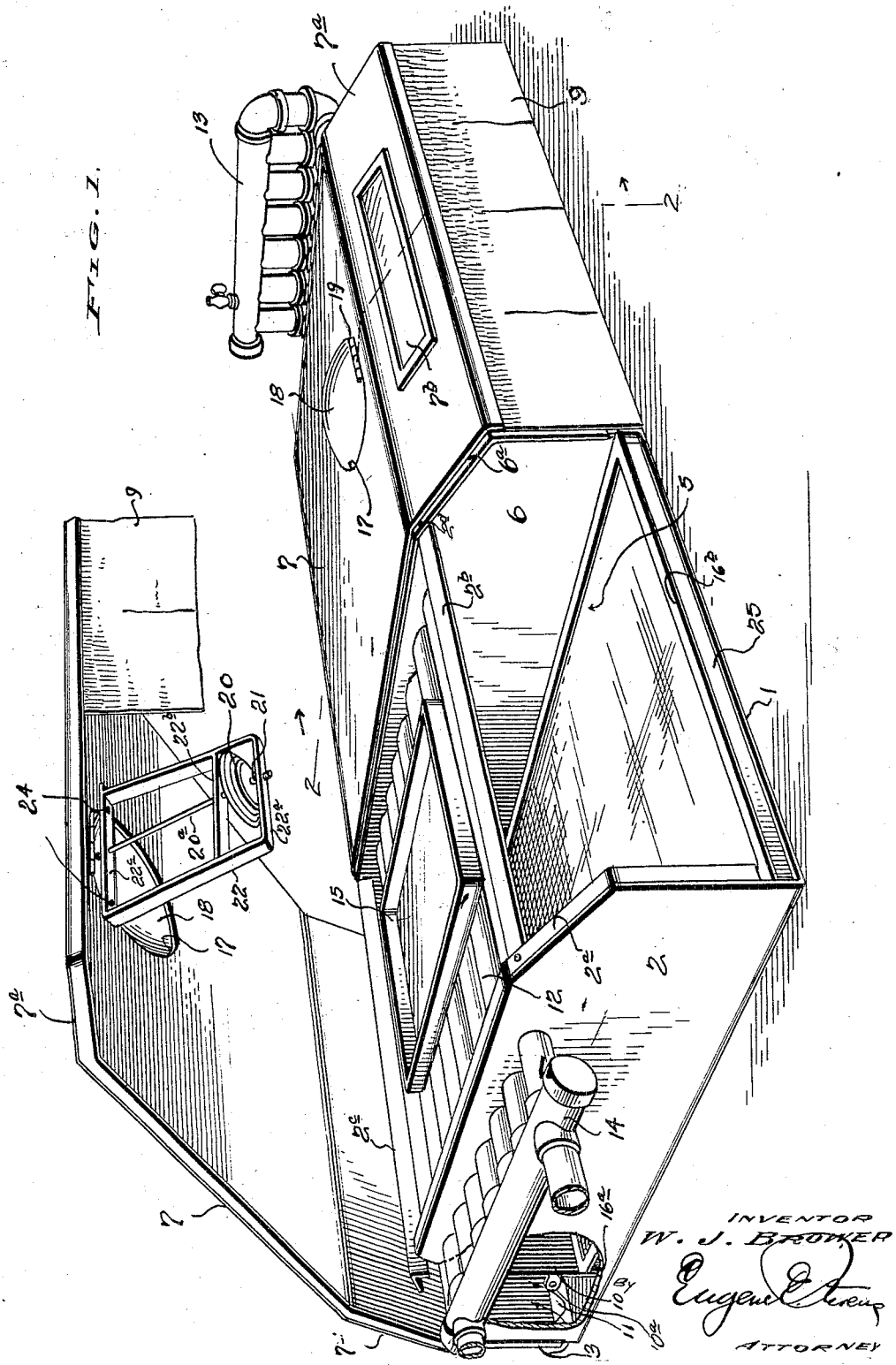

March 22, 1932.  W. J. BROWER  1,850,657
BROODER
Filed Dec. 19, 1928   2 Sheets-Sheet 2
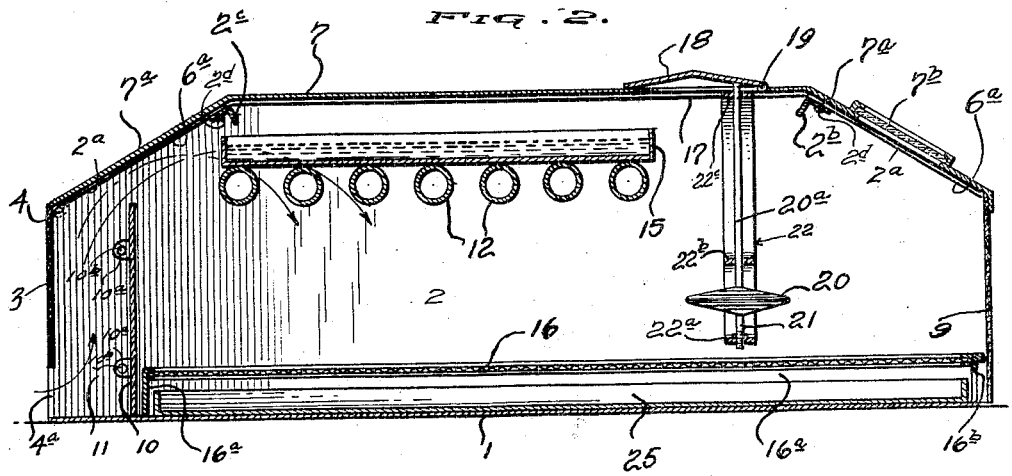
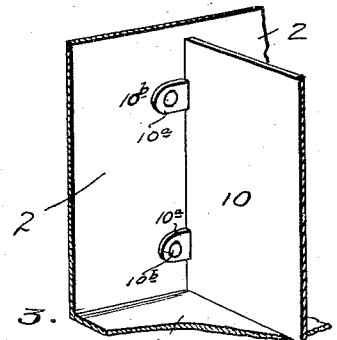
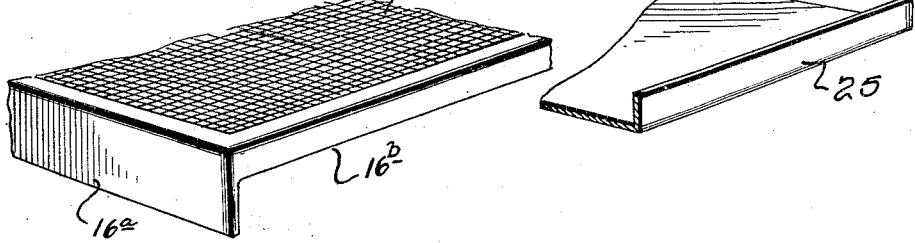
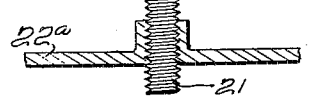
INVENTOR
W. J. BROWER
BY
ATTORNEY Patented Mar. 22, 1932

1,850,657

UNITED STATES PATENT OFFICE

WILLIAM J. BROWER, OF QUINCY, ILLINOIS

BROODER

Application filed December 19, 1928. Serial No. 327,155.

My invention relates to hovers or brooders, as they are known in the art, and which are employed in connection with the poultry industry for housing small chicks and other fowl.

Briefly stated, the invention has among its more important objects to provide a device of this character which entirely eliminates the danger of fire; protects the chicks from smoke fumes and gases and wherein the heating means is of such a character that a plurality of hovers may be heated from a single heating unit at a remote point.

The invention also contemplates a device of this character having a novel means for controlling the ventilation, heat and humidity of its interior whereby the health of the chicks can be effectually safe-guarded.

A further object of the invention resides in the provision of novel means whereby the hover may be readily kept clean and in a sanitary condition without in anywise disturbing the chicks.

It is also an object of the invention to furnish a hover as characterized, which will be of strong, durable, lice and mite proof construction of such simplicity that it will be capable of manufacture and sale at a low figure to meet the popular demand of the trade in devices of this nature.

The foregoing and other objects of the invention are attained by means of a novel combination and arrangement of parts to be hereinafter described and claimed, reference being had to the accompanying drawings which show the now preferred embodiment of the invention. It is to be understood, however, that the form of the invention shown and described is not to be considered as limitative and that various changes and modifications may be made therein without departing from the spirit and scope of the subject matter claimed hereinafter.

Referring specifically to the drawings, wherein the same reference characters designate the same parts in all views, Figure 1 is a perspective view, partly broken and partly in section, and illustrating the preferred form of the invention;

Figure 2 is a cross sectional view taken on the line 2—2 of Figure 1;

Figure 3 is a detail perspective view of a fragment of the removable wire mesh flooring of the hover;

Figure 4 is a fragmentary perspective view of a removable dropping pan;

Figure 5 is a detailed view, partly in cross section and partly broken, the same illustrating a thermostatic means, and Figure 6 is a detail view partly broken and partly in section.

Referring specifically to the drawings, the hover comprises a rectangular casing having a bottom wall 1, end walls 2, a rear wall 3 which may be of canvas, and one or more swingable top closures 7 which are hinged as at 4 adjacent the rear wall 3.

The casing is preferably divided into two or more compartments 5. In the form of the invention shown there are two compartments, each of which is designed to receive one colony or brood of chicks. Figure 1 shows a partition 6 separating the compartments.

Since the front of the housing is open, throughout its length, as shown, an angle bar or reinforcement $2^b$ is extended between the end walls 2 at the site of the downwardly sloping or biased forward portions $2^a$ thereof to act as a support for the asbestos-lined covers or closures 7. A similar angle bar $2^c$ is disposed at the site of the correspondingly biased-cut rear edge portions of walls 2 to support closures 7 at this point. Bars $2^b$, $2^c$ are secured by bolts $2^d$ to end walls 2 and extend and through partition 6 to rigidify the construction. The top corners of partition 6 are cut away on a bias corresponding to that of ends walls 2, as indicated at $6^a$.

Each of the compartments 5, defined by partition 6, is adapted to be closed at the top by one of the covers 7, previously referred to. The front and rear portions of the covers 7 are inclined, as indicated at $7^a$, so as to rest upon the biasedly cut partition and end wall portions. The forward door edges terminate at a point spaced from, and alined with the outer edge of the bottom 1. To the outer edge of each cover 7 are secured canvas curtains or flaps 9, or the like, which serve to close, to a certain extent, the space between the covers 7 and the floor 1, so as to keep in the heat, and at the same time permit the chicks to move in and out of the hover compartments 5. It will be understood, of course, that the depending curtains or flaps 9 are not of such a nature as to prevent the outward passage of air to the extent of interfering with the proper ventilation of the compartments.

As shown in Figure 2 a portion of the rear wall 3 is cut away, as indicated at 4ª or otherwise provided with air inlet means, and there is provided an upstanding partition 10 coextensive in length with the housing and which terminates at a point in proximity to the top wall 5,—the partition 10, as shown, being spaced from the rear wall 4 so as to provide an air inlet passageway 11 extending throughout the whole length of the casing or housing.

Figure 1 illustrates that the housing is provided with a plurality of heating pipes 12 extending the full length thereof and having their ends connected to suitable manifolds 13, 14, one or both of which may have means for connection to a steam or hot water supply pipe from a heating unit at some remote point. The relative location of the pipes 12 is best shown in Figure 2,—wherein they are depicted as being slightly above the upper edge of the longitudinal rear partition 10. It will be observed that the pipes 12 are designed to support a water pan 15 by means of which the interior of the housing will be kept at the desired degree of humidity. Inasmuch as the pan is supported by the heated pipes 12 the water therein will vaporize, to a greater extent than otherwise would be the case, and blend itself with the air within the casing or housing. Figure 2 illustrates the course of the air through the vertical rear passage 11 passing over the water pan, then downwardly in a heated condition above the chicks standing upon the wire mesh flooring 16, and subsequently outwardly through the flaps 9.

In order that the temperature, and humidity may be kept at a predetermined degree I have provided each cover 7 with a circular hole 17 which is adapted to be closed by a hinged closure 18 connected to the top wall as at 19, and controlled by the actuating rod 20ª of a thermostat 20. The thermostat 20 has a stem 21 threaded through the bearing B in bottom cross bar 22ª of a depending rectangular bracket 22 which is secured to the under surface of the closure 7, as indicated at 24. The intermediate and upper cross bars 22ᵇ, 22ᶜ, respectively of frame 22 have guide holes through which the actuating rod 20ª extends, as best shown in Figure 2.

Since there is a separate thermostatically controlled door or valve 18 for each compartment 5 it is possible to keep the same at different predetermined temperatures. Thus, chicks at different ages can be kept in the same hover. As will be evident, the setting of the thermostat 20 can be controlled by screwing the stem 21, in or out of the cross bar bearing B.

The wire mesh flooring upon which the chicks stand has already been incidentally referred to. This flooring is divided into units, one on either side of the partition 6. Each unit 16 has a marginal depending edge flange 16ª which supports the horizontal mesh portion in spaced relation to the bottom 1 of the housing or casing. Figures 2 and 3 illustrate that the front flange portion 16ª is cut away, as indicated at 16ᵇ, so as to provide a space sufficient for the withdrawal or insertion of the pan 25 which rests upon the bottom 1 and is designed to catch the droppings. The mesh of the wire forming the horizontal portion of flooring 16 is sufficiently large so as to let the droppings fall through and leave the surface clean at all times. It will be plain that the pan 25 can be withdrawn and cleaned without in any way disturbing the chicks. It is desirable that the pan 25 be lined with paper so that it may be readily cleaned. Of course, this is optional. Each of the covers 7 is shown provided with a glazed panel 7ᵇ for admitting light into the interior. The cover 7 furthermore gives ready access to the compartments for removal of the chicks as occasion may require. The glazed panel 7ᵇ is optional.

The longitudinal pipes 12 are spaced sufficiently from the wire mesh flooring 16 so as to avoid subjecting the chicks to excessive heat and are arranged in the path of the cold inflowing air so that by the time it reaches the chicks it will be warm and of suitable humidity.

It is important to note that when the closures 7 are down the depending frames 22 support the thermostats 20 at a point immediately above the heads of the chicks. Thus, the control of the valves or doors 18 will be governed by the temperature of the compartment atmosphere immediately adjacent the fowls rather than by the relatively hotter temperature of the area adjacent the pipes 12.

The inclined longitudinal side portions 7ª of closures 7 assure the free passage of the air through the hover and prevent the formation of air pockets. Partition 10 is secured to end walls 2 by bolts 10ᵇ extending through ears 10ª.

Having thus described my invention what I claim as new and desire to secure by Letters Patent is:

1. In a hover, a casing open at the top and at one side, a closure for said top and for obstructing said opening to a point adjacent the bottom of the casing, there being a space between the edge of said closure and the bottom of said casing to permit the chicks to go in and out, means swingably carried by the outer edge of said closure and engaging the bottom thereof to close the remainder of said opening, the wall of said casing opposite the first mentioned opening being cut away to define an air inlet, a partition within said casing and spaced from said last mentioned wall, said partition terminating short of the top of said casing whereby the air entering the casing will be directed toward the top wall thereof, heating means within said casing and adjacent said top wall, a water pan supported upon said heating means, the top wall of said casing having a valved opening, a bracket carried by said top wall, a thermostat carried by said bracket and engaging said top wall valve for controlling the opening and closing thereof in accordance with the temperature within the casing.

2. In a hover comprising a casing having a hinged top cover and having combined partially obstructed air outlet and chick-entrance-and-exit opening at one side thereof, the other side of said casing being cut away adjacent the bottom to define an air inlet opening, baffle means within said casing adjacent said last mentioned wall for directing the air upwardly toward the top of said casing, heating means adjacent the top of said casing, the latter having an opening, a valve closure for said top opening, a bracket adjacent said top opening, an adjustable thermostat carried by said bracket for adjusting the mean temperature within the hover and engaging said top opening closure for regulating the movements thereof according to the temperature within the casing, said bracket and thermostat wholly supported below the top cover.

3. The combination set forth in claim 2, and said thermostat being supported by said bracket adjacent the bottom of the casing and intermediate said heating means and said partially obstructed air outlet and chick-entrance-and-exit opening.

In testimony whereof I affix my signature.

WILLIAM J. BROWER.